(12) United States Patent
Afshar et al.

(10) Patent No.: US 7,715,412 B2
(45) Date of Patent: May 11, 2010

(54) DECOMPOSED H.323 NETWORK BORDER ELEMENT FOR USE IN A VOICE-OVER-INTERNET PROTOCOL NETWORK

(75) Inventors: Siroos K. Afshar, Manalapan, NJ (US); Marian Rogers Croak, Fair Haven, NJ (US); Radhika R. Roy, Howell, NJ (US); Ralph Utano, Fair Haven, NJ (US)

(73) Assignee: AT&T Corp., New York, NY (US)

( * ) Notice: Subject to any disclaimer, the term of this patent is extended or adjusted under 35 U.S.C. 154(b) by 1545 days.

(21) Appl. No.: 10/988,926

(22) Filed: Nov. 15, 2004

(65) Prior Publication Data
US 2005/0125696 A1 Jun. 9, 2005

Related U.S. Application Data

(60) Provisional application No. 60/528,045, filed on Dec. 9, 2003.

(51) Int. Cl.
*H04L 12/28* (2006.01)
(52) U.S. Cl. ............... 370/400; 370/401; 370/467; 709/204
(58) Field of Classification Search ............ 370/260, 370/328, 400, 401, 467; 709/204, 249
See application file for complete search history.

(56) References Cited

U.S. PATENT DOCUMENTS

| | | | |
|---|---|---|---|
| 5,838,683 A | 11/1998 | Corley et al. | |
| 5,875,234 A | 2/1999 | Clayton et al. | |
| 5,933,490 A | 8/1999 | White et al. | |
| 6,026,087 A | 2/2000 | Mirashrafi et al. | |
| 6,064,653 A | 5/2000 | Farris | |
| 6,185,204 B1 | 2/2001 | Voit | |
| 6,430,176 B1 | 8/2002 | Christie, IV | |
| 6,434,139 B1 | 8/2002 | Liu et al. | |
| 6,470,020 B1 | 10/2002 | Barker et al. | |

(Continued)

FOREIGN PATENT DOCUMENTS

EP 0 848 560 B1 4/2002

(Continued)

OTHER PUBLICATIONS

European Patent Office Search Report for Corresponding European Patent Application No. 04270013.8.

(Continued)

*Primary Examiner*—Fan Tsang
*Assistant Examiner*—Simon King (57) ABSTRACT

A decomposed H.323 border element is disclosed that is useful for providing an entry point from one or more H.323-based networks into a SIP-based VoIP network. In one embodiment, the signaling element of the BE is separated into a separate functional entity from the media control element to facilitate a single signaling entity controlling multiple media entities. In another embodiment, the security element of the border element is also separated from the media control element so that firewall and network address translation elements may be performed by a separate functional entity. In a further embodiment, the media transcoding element is separated from the media control element. In a final embodiment, the internetworking facility between the SIP and H.323 element is separate from the H.323 gatekeeper elements.

1 Claim, 6 Drawing Sheets

U.S. PATENT DOCUMENTS

| | | | |
|---|---|---|---|
| 6,934,534 B1* | 8/2005 | Roy | 455/414.1 |
| 2001/0043571 A1* | 11/2001 | Jang et al. | 370/260 |
| 2001/0046234 A1 | 11/2001 | Agrawal et al. | |
| 2005/0018652 A1* | 1/2005 | Crouch et al. | 370/352 |
| 2005/0141482 A1 | 6/2005 | Kleiner | |

FOREIGN PATENT DOCUMENTS

| | | |
|---|---|---|
| EP | 1 351 478 | 10/2003 |
| WO | WO 99/05590 | 2/1999 |

OTHER PUBLICATIONS

Stephens, et al., "SIP and H.323 Interworking VOIP Networks", BT Tech. Journal, Springer, pp. 119-127, Dordrecht, NL, vol. 19, No. 2, Apr. 1, 2001.

Anquetil, et al., "Media Gateway Control Protocol and Voice Over IP Gateways", Electrical Communication, Alcatel, pp. 151-157, Brussels, BE, Apr. 1, 1999.

Rosen, B., "VOIP Gateways and the Megaco Architecture", BT Technology Journal, Springer, pp. 66-76, Dordecht, NL, vol. 19, No. 2, Apr. 1, 2001.

* cited by examiner

DECOMPOSED H.323 NETWORK BORDER ELEMENT FOR USE IN A VOICE-OVER-INTERNET PROTOCOL NETWORK

This application claims the benefit of U.S. Provisional Application No. 60/528,045, filed Dec. 9, 2003, which is hereby incorporated herein by reference.

BACKGROUND OF THE INVENTION

Telecommunication services for voice and multimedia (e.g., audio, video, and data) have traditionally been provided using networking technologies such as public switched telephone networks (PSTN). Typically, in such networks, voice signals are converted to digital form and time division multiplexing (TDM) is used to allocate different conversations to periodic time slots. More recently, other networking technologies have been used to carry voice and multimedia information. Such technologies include internet protocol (IP), a formal set of rules for sending data across the internet; frame relay (FR), a telecommunication service providing variable-sized data packets for cost-efficient data transfer; and asynchronous transfer mode (ATM), a high speed networking standard. Such networks provide a single, common and shared infrastructure, thus flexibly enabling a potentially wide variety of new applications and services for customers.

Networks using these technologies employ a variety of call control services using a variety of protocols, for example, integrated services digital network user part (ISUP)-over-TDM, H.323-over-IP and session initiation protocol (SIP)-over-IP. The H.323 standard is a comprehensive and very complex suite of protocols that provide specifications for real-time, interactive videoconferencing, data sharing and audio applications such as IP telephony. Alternatively, the SIP protocol is advantageous as it is a streamlined protocol developed specifically for IP telephony in view of popular web-based services. More efficient than H.323, SIP takes advantage of existing protocols to handle certain parts of the call control process. For example, Media Gateway Control Protocol (MGCP), or H.248 protocol, is used between the signaling call control entity and the media gateway entity in a master-slave scheme, while SIP works as a peer-to-peer protocol between the signaling entities (e.g., call entity of MGCP or H.248) along with an indication of what media needs to be used by the media entities. Therefore, SIP can take the advantage of the master-slave protocol like MGCP or H.248 that is being used to provide the media control function of the devices satisfying the needs of SIP in order to set up the session. It may be noted that the media devices may be connected to the circuit-switched based networks, like PSTN.

Regardless the standard, as traditional PSTN networks migrate toward other networking technologies and protocols they must interface with networks using differing protocols (e.g., traditional PSTN networks). However, developing a single common cost-efficient architecture for real-time communication services for audio, video, and data that supports multiple existing call control protocols (e.g., PSTN, SIP and H.323) is difficult.

Many telecommunications providers are selecting IP as the access technology for new telecommunications networks that carry voice, data and multimedia information. Such networks are often referred to as Voice over IP (VoIP) networks. Many such providers are using a core network that uses the SIP protocol for signaling and call flow operations. Such SIP-based VoIP networks are advantageous in that they use the same access technology (IP) as many other networks, such as the Internet, which facilitates transmitting information to a wide range of destinations. However, while SIP-based telecommunications networks are advantageous, not all networks and components support SIP. Different call control mechanisms/signaling protocols over the IP networks may use different communication protocols. Therefore, there is a need to permit SIP networks to coexist with more traditional networks, such as circuit-switched networks, and/or IP networks operating with a different protocol.

To address this need, some IP telecommunications networks rely on nodes referred to herein as border elements (BEs) to provide an interface between a a customer's premises into the VoIP network infrastructure. Such BE's are typically used to translate between the protocol of a customer network and the SIP protocol used by the VoIP network as a common call control signaling protocol among different functional entities of the VoIP common infrastructure. These BEs also perform a wide variety of other functions, including signaling, call admission control, media control and security functions.

SUMMARY OF THE INVENTION

While current border elements are advantageous in many applications, the present inventors have recognized that these border elements are also disadvantageous in certain regards. Specifically, as discussed above, many current networks use the H.323 protocol as a call control signaling scheme over the IP-based telecommunication networks and, as a result, BE's or similar devices are necessary to translate between networks using the H.323 protocol and networks using another protocol, such as the SIP protocol. SIP will be used as the single call control communications protocol among all functional entities including H.323 BE of the VoIP common infrastructure in order to provide scalability for building the large-scale network using the standard-based protocol. However, traditional border elements are typically integrated network nodes, each implementing a signaling element, a media control element, a call admission control element and a security element. The present inventors have recognized that such integrated H.323 nodes are not cost or resource efficient in all implementations. Specifically, such integrated nodes result in a large cost associated with scaling a network to a larger size.

Therefore, the present inventors have invented a decentralized, or decomposed, H.323 BE that is useful for providing an entry point from one or more H.323-based networks into a SIP-based VoIP network. In one embodiment, the signaling element of the BE and the media control element are separated into separate functional entities. In this way, the signaling entity may control multiple media entities. In another embodiment, the security element of the BE is also separated into a separate functional entity from the media control element so that firewall and network address translation functions may be performed by a separate functional entity. In a further embodiment, the media transcoding element is separated from the media control element. In a final embodiment, the internetworking facility element between the SIP and H.323 networks is separate from the H.323 gatekeeper element. Any or all of these embodiments may be combined in order to create a BE that is decentralized, or decomposed, depending upon the needs of a particular network in order to add flexibility to network design and to reduce implementation and operations costs.

These and other advantages of the invention will be apparent to those of ordinary skill in the art by reference to the following detailed description and the accompanying drawings.

DETAILED DESCRIPTION OF THE INVENTION

Figure 1:
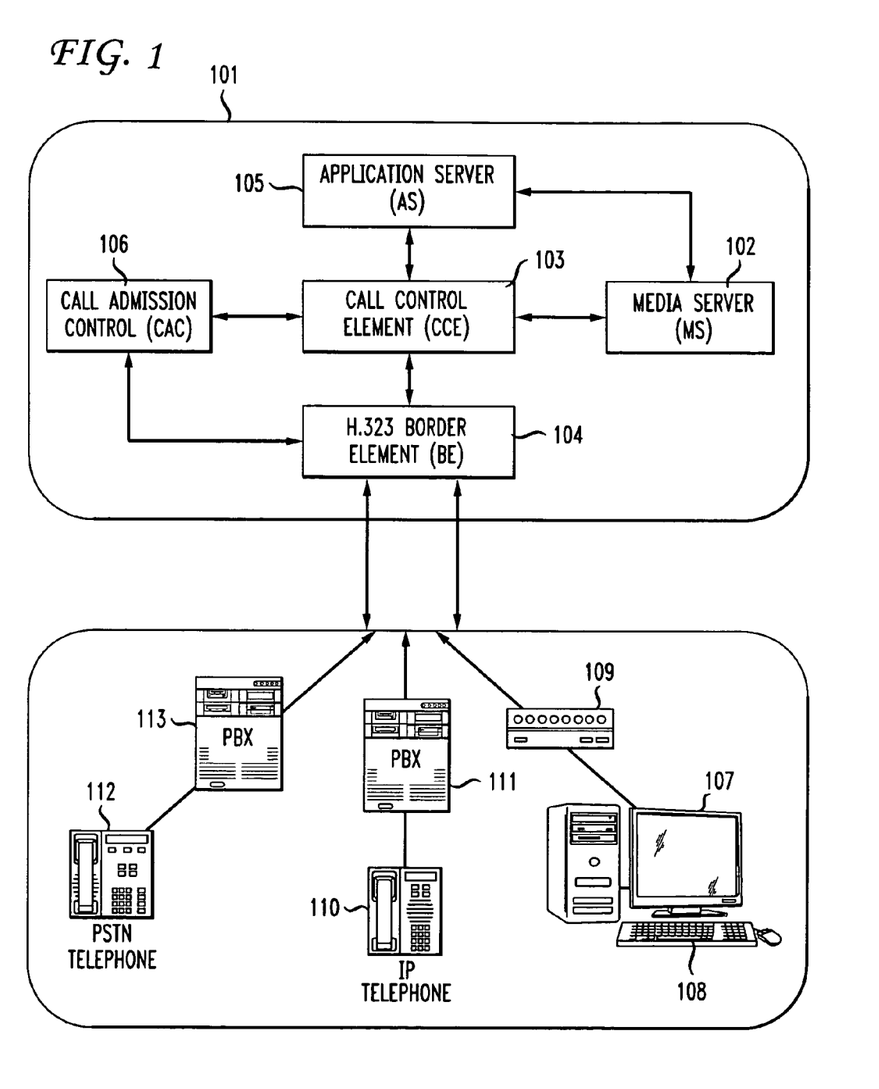
FIG. 1 shows an illustrative telecommunications network utilizing an H.323 Border Element (BE)

FIG. 1 shows a portion of a telecommunications network, specifically an IP-based telecommunication network 101 that interfaces with one or more networks, such as illustrative customer network 107. Network 107 is, illustratively, an Internet Protocol (IP) communications network at a customer premises that has, illustratively, Public-Switched Telephone Network (PSTN) telephone 112, IP telephone 110 and computer 108. Each of these devices is connected to network 101 through network 107 using, respectively, PBX 113, PBX 111 and network switch 109. IP networks, such as network 107, are used to transmit information from one IP address to another IP address by encapsulating that information into IP packets that each have, for example, addressing information in a header of each packet. This header is used by switches/routers in the IP network to route the packets to the intended destination and are, therefore, referred to as IP-switched networks. Such IP networks are well-known in the art and, therefore, will not be further described herein. As is also well-known, more traditional telecommunications networks (e.g., traditional PSTN networks) did not use IP packets to transmit information and, instead, relied upon time division multiplexing (TDM) of signals in a circuit-switched method to transmit signals to a destination node. One skilled in the art will recognize that, since network 107 is an illustrative IP network, the traffic originating from PSTN telephone 112 (which is typically associated with a circuit-switched network) will require conversion to IP packets in order for the call to be transmitted over network 107. This conversion may take place at illustrative PSTN telephone 112 or, alternatively, this conversion may illustratively take place at PBX 113. One skilled in the art will recognize that this conversion may take place at any network node in the path of transmission of a call from PSTN telephone 112 to network 101 through network 107.

Network 101 is, illustratively, a VoIP network operated by a telecommunications service provider that uses a specific protocol, such as the well-known session initiation protocol (SIP), as a single common internal signaling and call control protocol used by all VoIP infrastructure components within the network 101. Illustrative network 101 has call control element (CCE) 103, application server (AS) 105, call admission control server (CAC) 106 and media server (MS) 102. It may be necessary to interface network 101 with many different customer networks using many different communication protocols, such as SIP, H.323, TDM and/or any other protocol. Thus, in order to support communications to and from these networks, a gateway into network 101 for translating signals and media (e.g., calls) from one protocol to another is necessary. As discussed above, this function is typically performed by one or more interface nodes, called border elements (BEs), located at the border of the service provider's core VoIP network. In addition to translating from one protocol to another, such BEs also have a signaling element that acts as a gatekeeper to customer nodes. In this capacity, the signaling element receives requests for call set-up and relays those request to other network nodes, such as the CCE and CAC which then operate to dedicate resources to calls. Here, for example, the signaling entity would function as an H.323 gatekeeper for H.323 phones, IP-Public Branch Exchanges (PBXs) and other IP gateways.

Border elements also typically have a media element to handle and process media using a variety of different protocols at different levels. For example, one skilled in the art will recognize that the media element of a border element must be able to identify, route and process media streams conforming to the Real Time Transport Protocol (RTP), which is the Internet-standard protocol for the transport of real-time data, including audio and video. RTP is a high level protocol that can operate over many different transport network protocols, including IP networks. The RTP protocol is used in conjunction with quality of service and timing mechanisms and protocols (e.g, the well known Resource Reservation Protocol, or RSVP) to ensure that time-sensitive media streams are delivered to destinations within tight timing tolerances.

In addition to the above elements, the media element of a border element also typically acts to detect signals that do not require media processing, such as well known Dual-Tone Multi-Frequency (DTMF) signals. The media element then transmits those signals to the appropriate application server for any further necessary processing. Finally, the media element of a BE also may perform media transcoding to facilitate transmission of multimedia streams across the core network to destinations. Such transcoding is accomplished any time a destination of a call does not support a particular coder/decoder format or media type. For example, if a combined audio/video message is transmitted to a non-video capable terminal, transcoding may take place to transmit only the audio portion of the call in a format understood by the destination terminal. Similarly, if the destination terminal is video-capable, but does not support the video format transmitted, transcoding will be used to manipulate the video into a format understood by the destination terminal. Another example would be in text-to-speech systems. In this case, the transcoding element would manipulate the media streams to transform those streams into the desired format for further transmission.

In the illustrative example of FIG. 1, a single H.323 border element is used to interface with network 107 which is, in this illustrative example, using the H.323 communications protocol for signaling and call control within network 107. One skilled in the art will fully appreciate that a single network 107 interfacing with network 101 is merely illustrative in nature. The number and type of border elements in network 101 is purely an architectural issue to be selected based on the desired design of the network. Therefore, as is suggested above, SIP border elements, TDM border elements and other such border elements may be used to translate the calls sent to and received from different customers' networks using any number of different protocols.

In traditional border elements, many elements, such as the media element and signaling element described above, are typically integrated into one elemental entity and, often, into one network hardware node. However, each of the different functions performed by the different sub-elements of the border element has unique hardware requirements. For example, RTP media streams that are handled by the media element of the border element may require a bandwidth of 100 Gigabits per second (Gbps) or greater, thus requiring network and digital signal processing hardware necessary to handle such high bandwidth requirements. In media-dense core networks, in fact, it may be necessary to have many media elements to control the high volume of media traffic streaming into, across and out of the core network. Signaling elements, on the other hand, route low-bandwidth signals to and from the core telecommunications network to set up, route and terminate calls as well as to initiate services related to those calls. While signaling elements require modest processing power to rapidly process incoming and outgoing signals, those elements do not require as much processing resources as a media elements nor do they require the capability to handle as significant bandwidth as the media elements.

As stated above, in traditional border element implementations, one signaling element would correspond to one media element and handle all signaling for that media element. However, due to the bandwidth differences between signaling and media elements, the signaling element was not utilized at an optimal level and was frequently idle in many implementations. As a result, network-wide implementations of integrated border elements were relatively inefficient and were costly due to the need to provide a signaling element for every media element.

The present inventors have recognized that it may be advantageous in many applications to separate one or more elements of a traditional H.323 border element into separate functional entities to create what is referred to herein as a decomposed H.323 border element. As used herein, the term decomposed refers to separating the elements of a border element into distinct functional entities. Thus, for example, instead of an integrated border element, the media element may be separated from the signaling element. This separation may be a physical separation, whereby the media and signaling elements are hosted on separate network hardware devices. Alternatively, this separation may merely be a functional separation, whereby the media and signaling elements are hosted on the same hardware device, but as separate functional processes. In either case, to facilitate integration into existing networks, the border element may remain a single logical element from the point of view of other nodes in the network. Separating these elements into distinct functional entities permits greater scalability of network border elements as well as more efficient use of resources.

Figure 2:
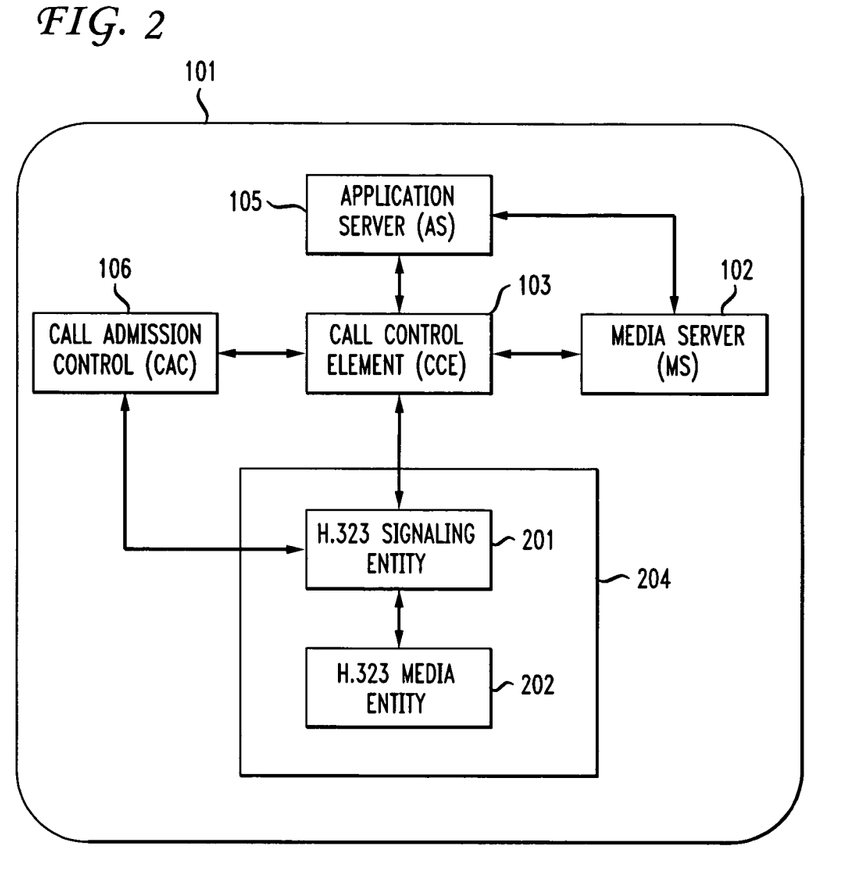
FIG. 2 shows a portion of the network of FIG. 1 in accordance with the principles of the present invention wherein the H.323 border element is decomposed by separating the H.323 signaling entity from the H.323 media entity.
Figure 3:
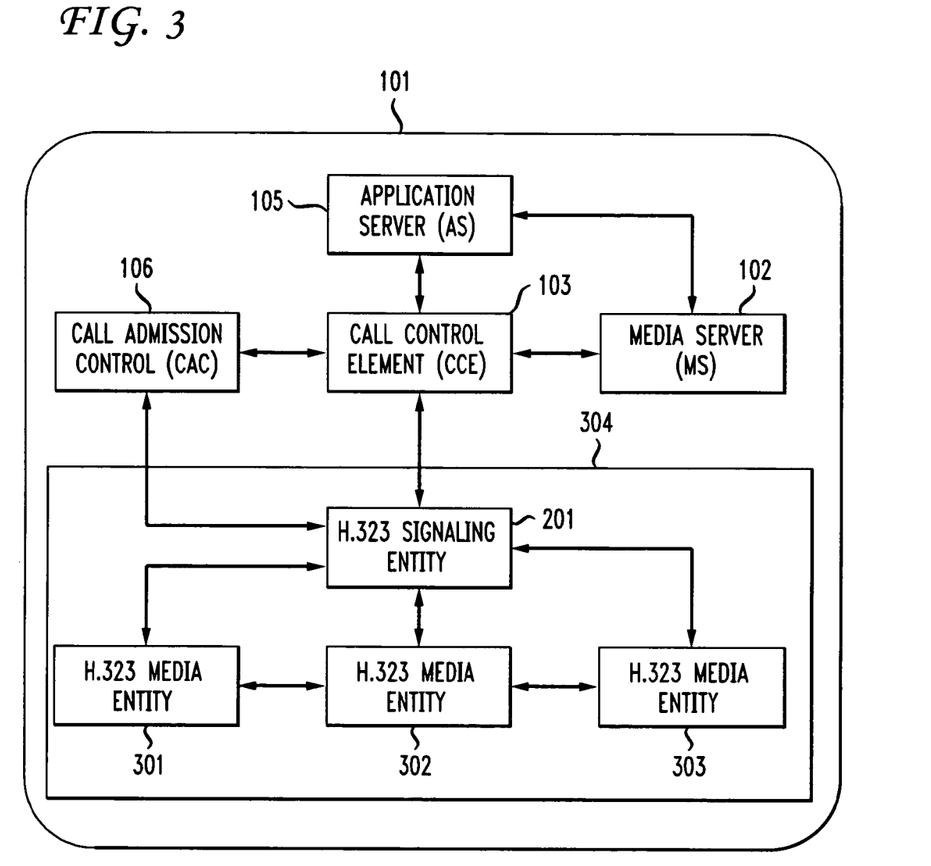
FIG. 3 shows the network of FIG. 2 wherein one H.323 signaling entity is used to control multiple H.323 media entities.

FIG. 2 shows one embodiment in accordance with the principles of the present invention whereby the H.323 signaling element in an H.323 border element 204 is separated into a distinct signaling entity 201 from the H.323 media entity 202 which performs media-related processing. In that figure, the signaling entity 201 would still communicate directly with the CAC 106 and CCE 103 to set up, route and terminate calls. However, as discussed above, separating the signaling element from the media element permits more flexible network design. For example, referring to FIG. 3, instead of a signaling element controlling a single media element, signaling entity 201 in FIG. 3 may control multiple media entities, such as media entities 301, 302 and 303. Such an architecture permits a greater degree of scalability of the network since, when an additional media bandwidth requirement is realized, additional stand-alone media entities (e.g., without a dedicated signaling entity) may be deployed. From a scalability standpoint, therefore, such stand alone media entities are less costly and more resource-efficient.

Figure 4:
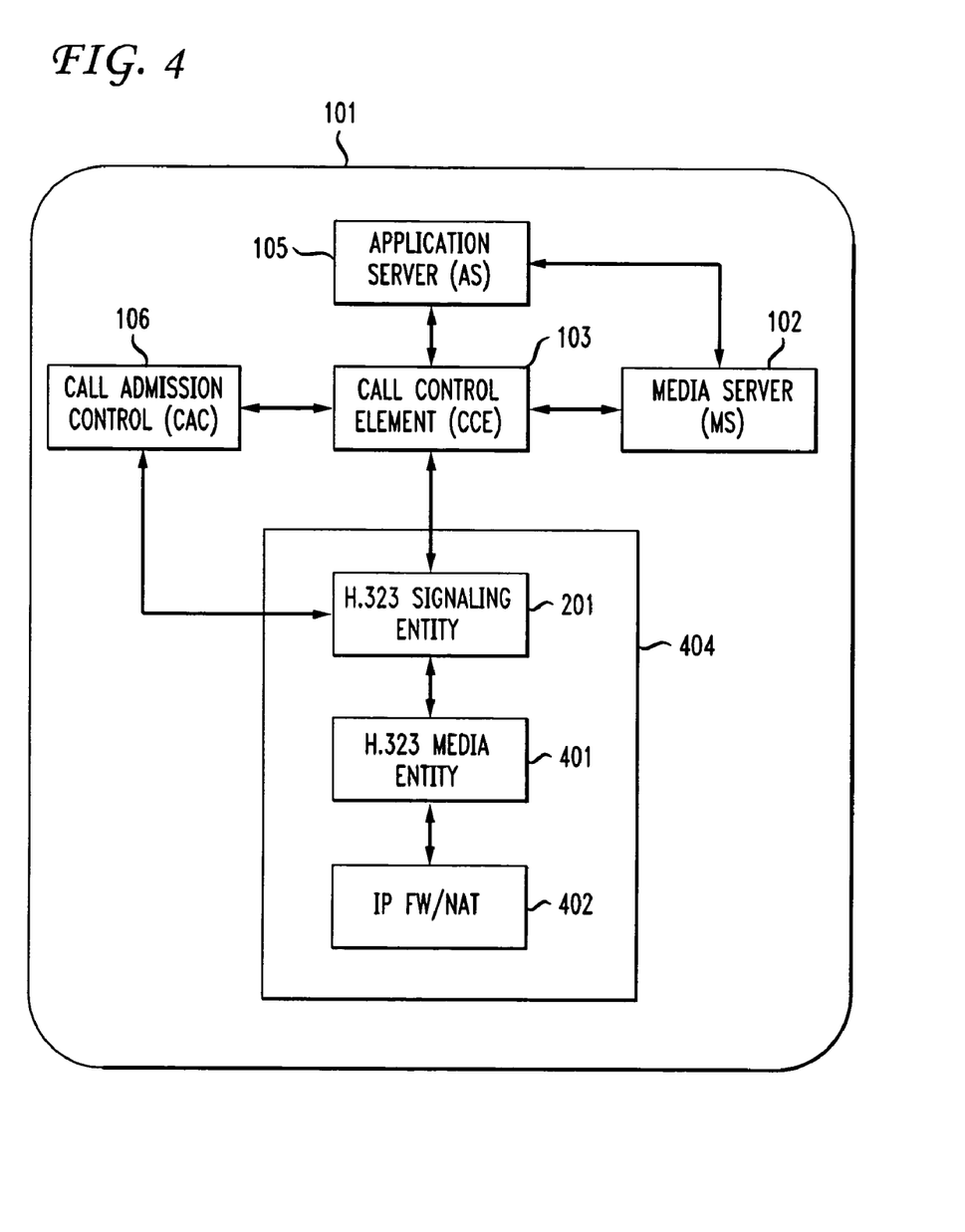
FIG. 4 shows the network of FIG. 2 wherein the H.323 media entity is further decomposed by utilizing a separate firewall/network address translator element.

In addition to separating the signaling and media entities from each other in a border element, it is also possible to further decompose the border element to enhance scalability. Specifically, in traditional border elements, the IP firewall and network address translation elements are integrated within the media element. However, as discussed above, media streams use the RTP protocol. Thus, although the firewall and network address translator are designed for use only with the IP protocol, they must be capable of relaying the RTP media streams to the media entity, thus increasing the complexity of the firewall/network address translation elements. This complexity can be reduced by separating the IP firewall and network address translation element into a distinct firewall/network address translation entity from the media entity. In this way, the IP firewall/network address translator entity can be optimized only for IP traffic while the media entity can be optimized only for RTP stream handling. FIG. 4 illustrates this separation where, more specifically, IP firewall and network address translator element is separated from the media entity 401 as firewall/network address translator entity 402. In this case, the firewall/network address translator entity 402 will handle only the incoming and outgoing IP traffic while the decomposed media entity 401 will handle the RTP media streams and, therefore, the complexity of the IP security element is greatly reduced. One skilled in the art will recognize that, although not illustrated specifically in FIG. 4, a single signaling entity may control multiple decomposed media entities (as illustrated in FIG. 2), each having a separated firewall/network address translator entity.

Figure 5:
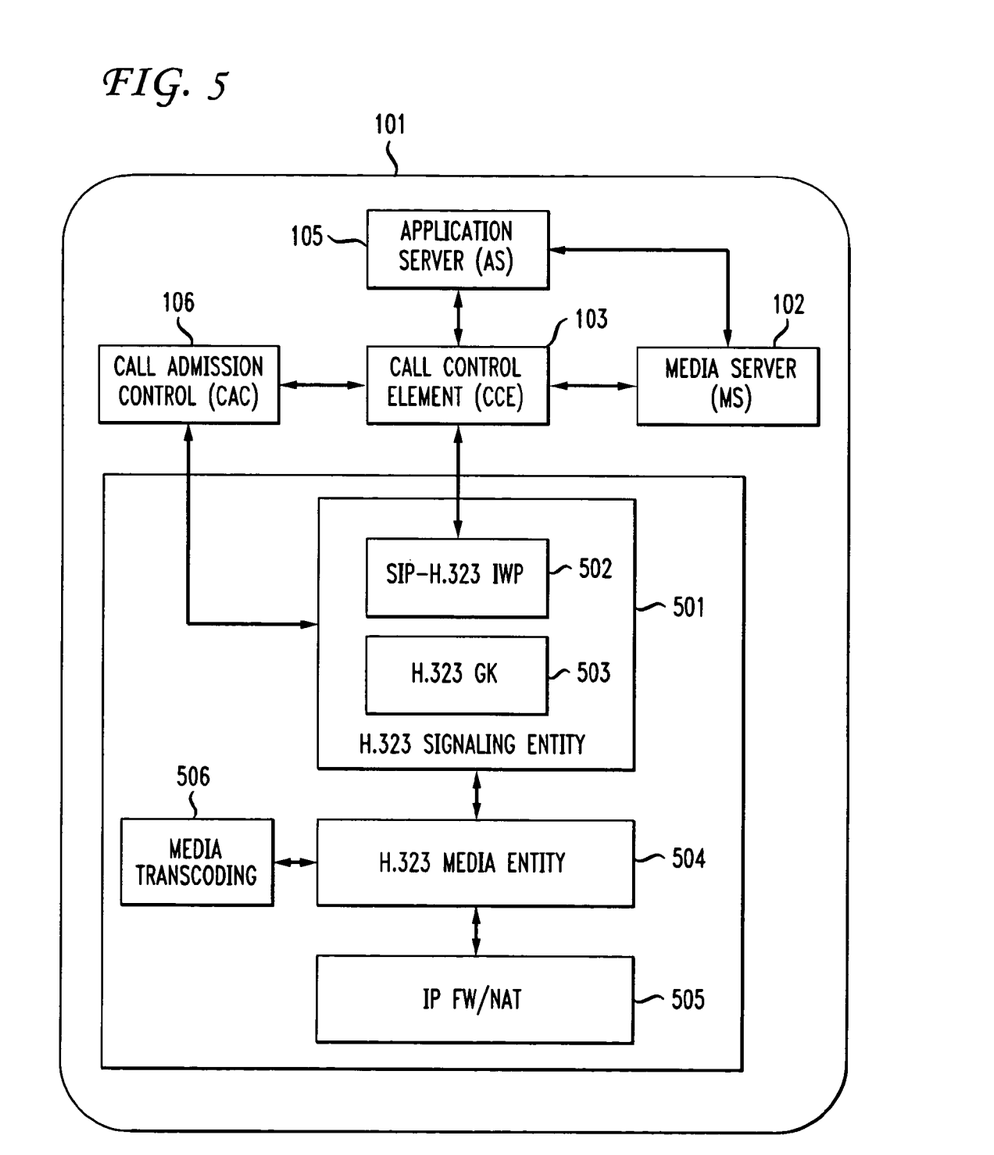
FIG. 5 shows the network of FIG. 4 wherein the H.323 media entity is further decomposed by utilizing a separate media transcoding element and the H.323 signaling entity is decomposed by separating the SIP-H.323 interworking facility from the H.323 gateway.
Figure 6:
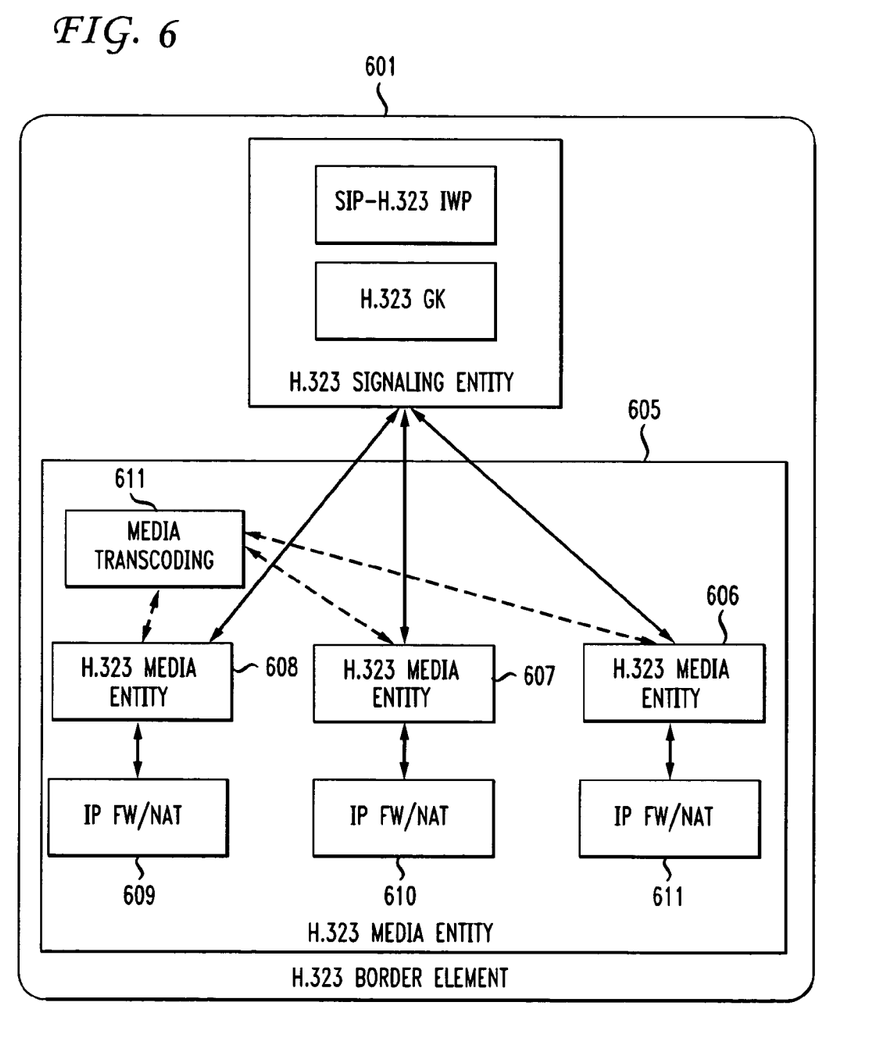
FIG. 6 shows an H.323 border element in accordance with the principles of the present invention wherein both the H.323 signaling entity and the H.323 media entity are fully decomposed.

FIG. 5 shows yet a further embodiment of a decomposed H.323 border element. As discussed above, traditional H.323 media elements perform significant media transcoding that requires significant processing abilities. However, the processing requirements for different border elements may differ depending on the types and population of the networks supported by the individual border elements. Therefore, referring to FIG. 5, one method of ensuring that individual border elements receive the necessary, but not excessive, processing ability is to separate the media transcoding element 506 into a separate media transcoding entity from the other elements of the media entity 504. In addition to separating firewall/network address translator entity 505 from the media entity, this further enhances the efficient scalability of the border element. For example, in a network with a high volume of multimedia traffic, multiple media transcoding entities might be necessary to transcode the media streams and ensure no delays are encountered. One skilled in the art will recognize that many different flexible and scalable architectures are possible in such a decomposed border element. For example, FIG. 6 shows a border element 601 with a media element 605 having multiple media entities 606, 607 and 608 with decomposed firewall/NAT entities 611, 610 and 609, respectively. Media entities 606, 607 and 608 are served by a single media transcoding entity 611. This architecture may be desired, for example, in low volume networks to avoid the unnecessary expense of having individual media transcoding elements with each media entity.

Other H.323 border element decomposition methods are also possible. For example, the H.323 signal element typically elements as both an H.323 gatekeeper (as discussed previously) as well as a SIP-H.323 interworking element (IWF) for signaling in core networks relying on the SIP protocol. As also discussed previously, the H.323 gatekeeper element operates to receive communication requests from customer networks, such as network 107 in FIG. 1, and control those calls. For example, in order to set up a call, the gatekeeper element of the signaling entity transmits a call request to the CAC and CCE elements of the core VoIP network which then provision the necessary resources for the call. The SIP-H.323 IWF elements to translate SIP signaling message to H.323 formatted messages and vice versa to permit seamless signaling between the customer networks and the core VoIP network. Referring once again to FIG. 5, one possible decomposition of the H.323 signaling entity 501 in a border element is illustrated. Specifically, in FIG. 5, the H.323 gatekeeper element is separated from the SIP-H.323 IWF, thus forming distinct gatekeeper entity 503 and SIP-H.323 IWF entity 502. For similar reasons as discussed above, it may be desirable to have a single gatekeeper entity with multiple interworking entities or, alternatively, several gatekeeper entities may be selected to operate with a single interworking entity.

One skilled in the art will recognize that many variations are possible and that any or all of these embodiments described herein above may be combined in order to create a border element function that is decentralized depending upon the needs of a particular network in order to add flexibility to network design and to reduce implementation and operations costs. The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A border element for interfacing an H.323 compliant network with a session initiation protocol (SIP) compliant network, said border element comprising:
   an H.323 signaling element for providing signaling control between said H.323 compliant network and said SIP compliant network, said H.323 signaling element comprising:
      a SIP-H.323 interworking facility element; and
      an H.323 gatekeeping element;
      wherein said SIP-H.323 interworking facility element is a separate functional entity from said H.323 gatekeeping element; and
   a plurality of H.323 media elements for processing media streams, each of said plurality of H.323 media elements controlled by said H.323 signaling element and each of said plurality of H.323 media elements comprising:
      a media control element;
      a media transcoding element;
      a firewall element; and
      a network address translator element;
      wherein said media control element and said media transcoding element are separate functional entities from said firewall element and said network address translator element;
   wherein said H.323 signaling element is a separate functional entity from each of said plurality of H.323 media elements.

* * * * *